Nov. 4, 1947.　　　L. A. HICKSON　　　2,430,115
FISHING RIG OR LEADER
Filed March 2, 1945
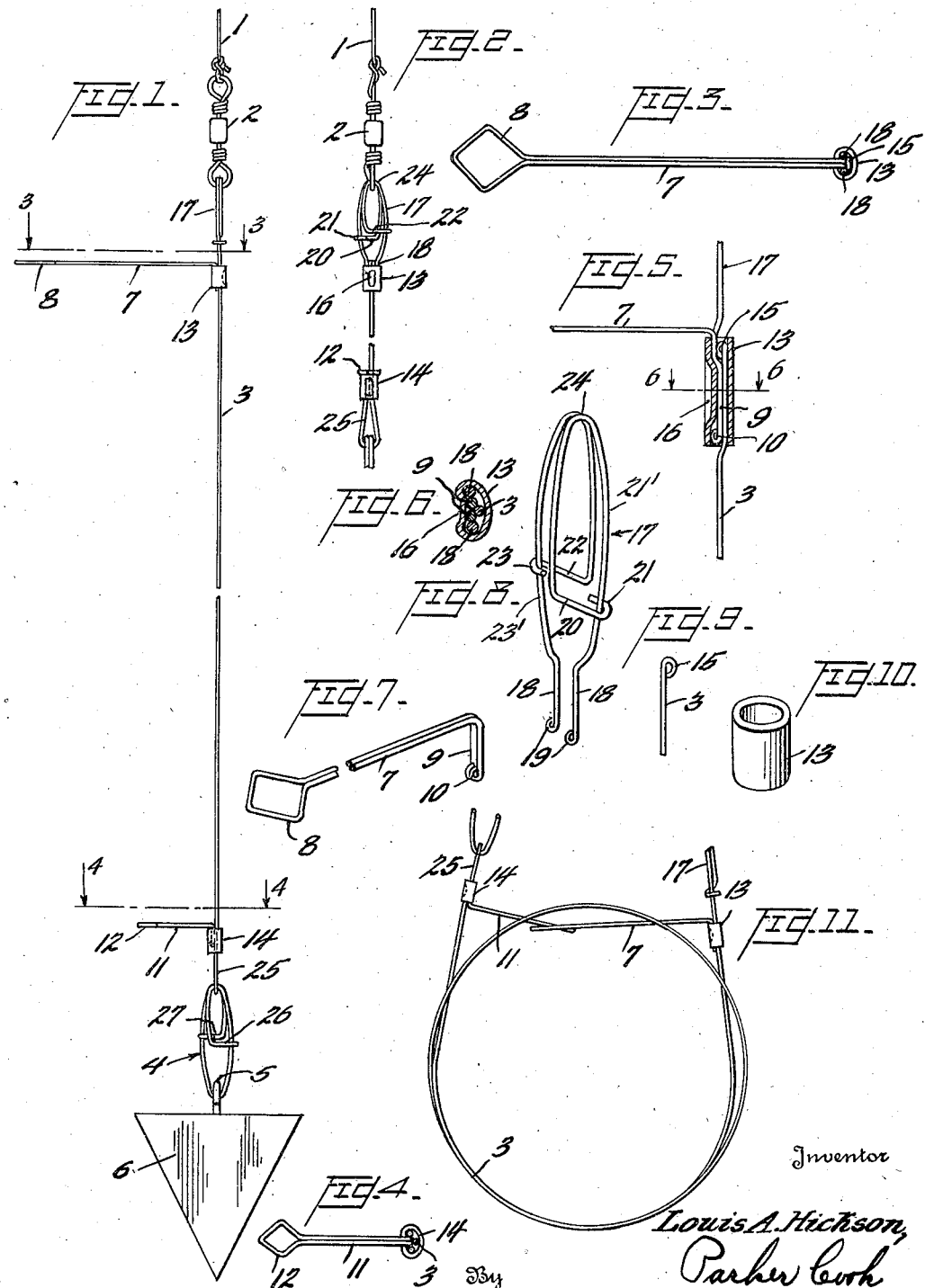
Inventor
Louis A. Hickson,
By Parker Cook.
Attorney Patented Nov. 4, 1947

2,430,115

UNITED STATES PATENT OFFICE 2,430,115

FISHING RIG OR LEADER

Louis A. Hickson, Philadelphia, Pa.

Application March 2, 1945, Serial No. 580,553

2 Claims. (Cl. 43—28)

My invention relates to new and useful improvements in fishing rigs and the present application is a continuation in part of an application filed by me on November 1, 1944, bearing Serial No. 561,421.

The present application also contemplates the utilization of a main wire or leader from which extend two arms or spreaders, one for supporting the upper hook and one for supporting the lower hook together with two collars which, when respectively deformed, hold the spreaders in a fixed position.

In addition to the above, the present invention contemplates the use of an upper link that is fixedly secured in place, which link can be opened or closed so that a swivel may be attached at any time rather than during the formation of the rig.

Furthermore, the invention contemplates the forming of a small bead or beads on the inner end of the spreaders and on the inner end of the free end of the fixed link and on the free end of any loop; so that after the free ends with the beads thereon are placed through the respective collars and the collars are deformed, there is no possibility of the free ends pulling out of the collars unless the collars were entirely mutilated or broken.

Still another object of the invention is to provide the spreaders with loops at their outer ends in which may be threaded the gut leaders of the respective hook to thus always hold the leader at the outer end of the spreader away from the main leader.

Still another object of the invention is to provide a fishing rig having an upper and lower spreader each with an eyelet at its outer end, the one eyelet being larger than the other with the spreaders so formed that the larger eyelet may be turned on edge and the eyelet and the arms of the smaller spreader forced slightly apart so that the larger of the eyelets may be passed therethrough so that when the rig is wound for packing the two ends of the rig will be held together and the rig may then be packed in a relatively light paper or cellophane envelope and cannot spread or become unwrapped to force itself out of the envelope.

Still another object of the invention is to provide a strong and efficient rig or leader having a fixed openable link at its upper end and a closed loop, if desired, at its lower end so that a detachable link may be passed therethrough to secure the sinker or dipsy.

With these and numerous other objects in view, the invention consists in certain new and novel features or constructions as will be hereinafter more fully described and pointed out in the claims.

Referring now to the drawings showing a preferred embodiment:

Fig. 1 shows the completed rig with the sinker attached;

Fig. 2 is a similar view without the sinker and taken at right angles to Fig. 1;

Fig. 3 is an enlarged sectional view taken on line 3—3 of Fig. 1;

Fig. 4 is an enlarged sectional view taken on line 4—4 of Fig. 1;

Fig. 5 is an enlarged detailed sectional view of the collar showing the manner in which the collar is crimped to hold the ends of the several parts;

Fig. 6 is an enlarged detailed sectional view taken on line 6—6 of Fig. 5;

Fig. 7 is a perspective of the upper spreader;

Fig. 8 is an enlarged perspective of the upper link;

Fig. 9 is a detailed view showing how the end of the free end of a loop or leader is bent to prevent the same from ever slipping through the collar;

Fig. 10 is an enlarged perspective of a collar; and

Fig. 11 is an elevational view showing the leader wrapped for packing with the one spreader passing through the other spreader.

Referring now for the moment to Fig. 1, there is shown the end of a fishing line 1 which is secured to the one eyelet of a barrel swivel 2. The other end of this barrel swivel 2 is placed within an openable link 17 which link, in turn, is functionally integral with the main wire or strand 3 of the leader or fishing rig.

The link 17 is held in place by the collar 13 which will be hereinafter mentioned. Also fixedly held to the main strand 3 is the upper spreader 7, while near the lower end of the leader is fixedly secured the lower spreader 11 by a similar collar 14 which also secures the lower free end of the leader 3 to form the fixed loop 25.

Through the lower loop 25 of the leader may be passed an openable link 4 which link is shown in detail in a previous application filed by me on Dec. 16, 1944, Serial No. 568,475. This detachable link 4 may have previously been passed through the eyelet 5 of a sinker 6, the sinker 6 in the present instance being of the pyramidal type, although a bank sinker or any other form of sinker may be used.

Of course, the rig or leader is complete, that is, from a commercial standpoint without the sinker, but I have illustrated a sinker in place to show how the same may be conveniently attached.

Having thus generally described the rig or leader as it will be used, with the exception of course, that the hooks are not shown as connected to the respective spreaders, reference will now be made in detail to the several parts, and first to the connecting link 17 which is shown on an enlarged scale in Fig. 8.

It will be seen that this link 17 is somewhat similar to the connecting link shown in the previous application mentioned above to wit: Serial No. 568,475, filed Dec. 26, 1944, with the exception, however, that this link is to be a permanent part of the rig, and is made of two pieces of wire rather than one piece of wire.

Furthermore, the lower portion of the link has two free ends 18 and then the free ends are respectively turned back on themselves as at 19 to thus form an enlarged portion or bead, the purpose of which will be shortly described.

The wire strands of the connecting link are bent back on themselves as at 24, and then the one end is bent transversely of the loop to form a crossbar 20 with the hook 21 at its end, while the other strand of the loop is likewise bent to form a crossbar 22 but extending in the opposite direction and then provided with its hook 23. These respective hooks 21 and 23 lock or fasten over their respective upright portions 21' and 23'.

Referring to Fig. 9 for the moment, it will be seen that the upper end of the leader 3 is also provided with a small bead or return bend 15 so that here again there is an enlarged end similar to the enlarged ends 19 on the free ends of the connecting link 17.

Now, referring for the moment to Fig. 7, there will be seen what I term the upper spreader 7 with its preferably rectangular eyelet 8 at its outer end and the downturned legs 9 at its inner end, and in a like manner the free ends of these legs are also provided with small beads 10.

This spreader is formed from one piece of wire and the parts bent to the shape shown.

Referring for the moment to Figs. 1, 6, and 10, it will be seen that in assembling the upper part of the rig that a small tubular metal collar 13 is placed over the main strand 3, after which the free ends 18 of the link 17 are also passed down through the collar and likewise the free ends or legs 9 of the upper spreader 7 are passed within the collar.

The collar 13 then is crimped or bent or mashed in centrally on its side as shown at 16 with a tool (not shown) so that the enlarged end 15 (see Fig. 5) is above the crimped portion 16 of the collar whereas the enlarged ends 10 and the legs 9 of the spreader 7 and the enlarged ends 19 of the link 17 will be below the crimped portion 16 of the collar.

It might be mentioned that the collar 13 is preferably made of copper and heat treated and then tinned with block tin to make it resistant to the action of the salt water. Furthermore, by heat treating the copper collar, it may be more easily internally distorted thus making for a greater physical contact area than would be the case if just the non-treated copper were used.

This collar, therefore, tightly binds the spreader 7, the link 17 and the main strand 3 together and prevents any of the several ends from ever being pulled from without the collar.

There is little if any possibility of the parts slipping with respect to each other and even should there be a slight slippage which is practically impossible, still the enlarged ends abutting against the crimped portion of the collar will prevent any parts from being pulled without the collar unless, of course, the whole collar were split or completely destroyed.

In numerous breakdown tests and using a steel wire that will withstand one hundred fifty or two hundred pounds tension before breaking, I have found that these parts will readily withstand a tension of some one hundred and fifty or two hundred pounds or, in other words, the wire will break before the elements can pull apart.

It might be mentioned here that all the parts are preferably made of a stainless steel wire so that continued use in salt water will not affect their life or service.

It will be remembered that in my former application to wit: Serial No. 561,421, filed Nov. 1, 1944, the free ends were crimped in the same way within the collar but the ends did not have these enlarged portions or beads formed thereon.

In Fig. 5, the free ends 18 of the loop 17 are not shown as crimped within the collar and were omitted merely for clearness of illustration, although it will be understood that they are fitted within the collar as just described and held similar to the free ends of the spreader 7. In Fig. 6 the several strands are all shown as crimped within the collar.

Referring to Fig. 4, there is shown the lower spreader which is exactly the same as the upper spreader 7, only it is not as large, there being a smaller loop 12 at its outer end and its inner end will be bent downwardly as shown in the dotted lines in Fig. 1 and will have return beads at the ends of the legs (not shown).

At the lower end of the leader 3, the strand will be bent to form a loop 25 and its ends will have beads similar to the bead 15 in Fig. 9. In other words, wherever there is a free end to be held in a collar, it will have a small return bend or bead formed thereon so that there will be no possibility of the end pulling from without its collar.

To hold this loop 25 in position and to secure the spreader 11, I employ a collar 14 similar to the aforementioned collar 13 and crimp in the side in exactly the same manner that the link 13 is crimped. Through this loop 25 may be passed the aforementioned link 4 with its locking crossbars 26 and 27, the link being similar in all respects to the link shown in my application above mentioned to wit: filed Dec. 16, 1944, Serial No. 568,475.

By forming the respective eyelets 8 and 12 on the outer ends of the spreaders 7 and 11, it will be understood that a loop or eyelet of a gut leader of a hook (not shown) can be passed over the respective eyelet and then the hook fed back through the eyelet of the spreader to thus secure the hook to the spreader and by having eyelets at the far end of the spreaders, these gut loops will not work back and forth readily of the spreaders and will thus hold the hooks and their gut away from its main strand 3 to thus prevent tangling about the rig.

Referring to Fig. 11 for the moment, I have shown the rig as ready for packing. These rigs are generally packed in a Cellophane envelope and unless the upper and lower ends are curled around and around the body of the leader, they are likely to spread and force themselves out of the envelope.

However, I have found that with the construction above shown if I take the upper spreader 7 and turn it at right angles to that shown in Fig. 1, I can spread the body of the lower spreader 11 and force the eyelet 8 of the upper spreader 7 through the eyelet 12 of the spreader 11 and the bars of the body and then turn it again to the position shown in Fig. 1 and Fig. 11 and thus hold the two ends of the leaders in the position shown in Fig. 11. Then there is no possibility of the leader unwrapping or uncurling, which makes for quicker and better packaging.

From the foregoing, it will be seen that I have provided an efficient rig or leader that is easily assembled, will be efficient in service and is practically impossible to destroy as regardless of the amount of tension placed on any or all of the parts, the line will snap long before the rig will be broken.

It can be used with a light line or it can be used with a relatively heavy line and still never pull apart or break in service.

Due to present conditions, swivels are practically impossible to obtain but by forming the rig as shown, the rigs can be made up in quantities and later on when swivels are obtainable, they can be easily fitted in the upper loop 17 as shown in Fig. 1.

Many slight changes may be made without in any way departing from the spirit and scope of my invention.

Having thus described my invention what I claim is new and desire to obtain by Letters Patent is:

1. In a fishing rig, a main wire or leader, supporting means at the upper end of the leader, a wire spreader having an eyelet at its outer end and the inner end of the spreader secured to the leader; a lower spreader also provided with a smaller eyelet at its outer end and having its inner end fixedly secured to the leader, supporting means at the lower end of the leader, the smallest dimension in the plane of the larger eyelet being greater than the largest dimension in the plane of the smaller eyelet and the legs of the spreader having the smaller eyelet being substantially parallel and of spring wire, whereby the larger eyelet may be forced through the smaller eyelet with a portion of the larger eyelet passing between the legs of the spreader with the smaller eyelet to thus prevent the leader from becoming unwound when the leader is in a coiled condition.

2. In a fishing rig, a main wire or leader, supporting means formed at the upper end of the leader, a wire spreader formed of one piece of wire and bent back on itself and having an eyelet formed at its outer end and downwardly extending legs at its inner end, means for securing the spreader to the leader; a similar but smaller spreader secured near the lower end of the leader, supporting means also secured at the lower end of the leader, the smallest dimension in the plane of the larger eyelet being greater than the largest dimension in the plane of the smaller eyelet and the legs of the spreader having the smaller eyelet being substantially parallel and of spring wire, whereby the larger eyelet may be forced through the smaller eyelet with a portion of the larger eyelet passing between the legs of the spreader with the smaller eyelet and thus prevent the leader from unwinding when the said leader is in a coiled condition.

LOUIS A. HICKSON.

REFERENCES CITED

The following references are of record in the file of this patent:

UNITED STATES PATENTS

| Number | Name | Date |
|---|---|---|
| 401,244 | Basel | Apr. 9, 1899 |
| 503,181 | Webb | Aug. 15, 1893 |
| 745,131 | Abbath | Nov. 24, 1903 |
| 806,789 | Fleeger | Dec. 12, 1905 |
| 953,125 | Desmond | Mar. 29, 1910 |
| 1,159,325 | Mitchell-Henry | Nov. 2, 1915 |
| 1,236,551 | Dillon | Aug. 14, 1917 |
| 1,702,417 | Sandbo | Feb. 19, 1929 |
| 2,250,278 | Skoverski | July 22, 1941 |
| 2,392,147 | Hickson | Jan. 1, 1946 |